United States Patent
Quinn et al.

(10) Patent No.: US 10,628,570 B2
(45) Date of Patent: Apr. 21, 2020

(54) PROTECTION OF DATA IN A ZERO USER INTERFACE ENVIRONMENT

(71) Applicant: FMR LLC, Boston, MA (US)

(72) Inventors: Michael Quinn, Co. Dublin (IE); Adam Schouela, West Newton, MA (US); Adrian Ronayne, Co. Mayo (IE); Emily Elwell, Revere, MA (US); Aaron Montford, Somerville, MA (US)

(73) Assignee: FMR LLC, Boston, MA (US)

( * ) Notice: Subject to any disclaimer, the term of this patent is extended or adjusted under 35 U.S.C. 154(b) by 196 days.

(21) Appl. No.: 15/980,555

(22) Filed: May 15, 2018

(65) Prior Publication Data
US 2018/0330069 A1    Nov. 15, 2018

Related U.S. Application Data

(60) Provisional application No. 62/506,072, filed on May 15, 2017.

(51) Int. Cl.
*G10L 15/00* (2013.01)
*G06F 21/32* (2013.01)
(Continued)

(52) U.S. Cl.
CPC .......... *G06F 21/32* (2013.01); *G06F 21/6245* (2013.01); *G06N 3/0481* (2013.01); *G06N 3/084* (2013.01); *G06N 5/046* (2013.01); *G10L 15/16* (2013.01); *G10L 15/22* (2013.01); *G10L 15/26* (2013.01); *G10L 15/265* (2013.01); *G10L 2015/088* (2013.01)

(58) Field of Classification Search
CPC ... G10L 15/22; G10L 2015/223; G10L 15/26; G10L 15/265; G10L 15/30; G10L 15/08; G10L 15/00; G10L 17/005; G06F 3/167; G06F 3/0482; G06F 3/16
See application file for complete search history.

(56) References Cited

U.S. PATENT DOCUMENTS 7,590,536 B2 *   9/2009   Bates .................... G10L 15/197
                                                                704/231
8,359,020 B2    1/2013   Lebeau et al.
(Continued)

FOREIGN PATENT DOCUMENTS

WO    WO 2015/196063    *  6/2014   ............ G10L 15/28

Primary Examiner — Edgar X Guerra-Erazo
(74) Attorney, Agent, or Firm — Proskauer Rose LLP

(57) ABSTRACT

Described herein are methods and systems for secure communication of private audio data in a zero user interface computing environment. A server receives text generated from a first digital audio bitstream, the digital audio bitstream corresponding to speech captured by a zero user interface computing device from a user. The server analyzes the text to extract a set of keywords from the text. The server determines whether information responsive to the keywords comprises private data related to the user. If the information responsive to the set of keywords comprises private data: the server generates a text response to the set of keywords that includes the private data relating to the user, determines a personal audio playback device associated with the user, and transmits the generated text response to the personal audio playback device for playback as a second digital audio bitstream.

22 Claims, 7 Drawing Sheets

(51) Int. Cl.
*G10L 15/26* (2006.01)
*G10L 15/22* (2006.01)
*G10L 15/16* (2006.01)
*G06N 5/04* (2006.01)
*G06F 21/62* (2013.01)
*G06N 3/04* (2006.01)
*G06N 3/08* (2006.01)
*G10L 15/08* (2006.01)

(56) References Cited

U.S. PATENT DOCUMENTS

| | | | | |
|---|---|---|---|---|
| 8,738,925 B1* | 5/2014 | Park | | H04B 7/26 |
| | | | | 713/186 |
| 9,189,196 B2* | 11/2015 | Doherty | | G06F 3/167 |
| 9,484,030 B1* | 11/2016 | Meaney | | G10L 15/22 |
| 10,134,399 B2* | 11/2018 | Lang | | G06F 3/165 |
| 10,331,399 B2 | 6/2019 | Alsina et al. | | |
| 2006/0004834 A1* | 1/2006 | Pyhalammi | | H04N 5/4403 |
| 2007/0216764 A1* | 9/2007 | Kwak | | G07C 9/00309 |
| | | | | 348/14.06 |
| 2010/0070922 A1* | 3/2010 | DeMaio | | G06F 3/0482 |
| | | | | 715/811 |
| 2013/0311997 A1* | 11/2013 | Gruber | | G06F 9/4843 |
| | | | | 718/102 |
| 2014/0100848 A1* | 4/2014 | Shaffer | | G10L 15/22 |
| | | | | 704/240 |
| 2015/0128065 A1* | 5/2015 | Torii | | G06F 3/1454 |
| | | | | 715/746 |
| 2015/0170643 A1* | 6/2015 | Nicholson | | G06F 21/32 |
| | | | | 704/254 |
| 2016/0125879 A1* | 5/2016 | Lovitt | | G10L 17/10 |
| | | | | 704/275 |
| 2016/0127780 A1* | 5/2016 | Roberts | | H04N 21/4312 |
| | | | | 725/44 |
| 2016/0248768 A1* | 8/2016 | McLaren | | H04L 63/10 |
| 2016/0262017 A1* | 9/2016 | Lavee | | G06F 21/31 |
| 2017/0357478 A1* | 12/2017 | Piersol | | G06F 3/167 |
| 2018/0074785 A1* | 3/2018 | Ohmura | | G06F 3/0487 |
| 2019/0088261 A1* | 3/2019 | Lang | | G06F 3/165 |

* cited by examiner

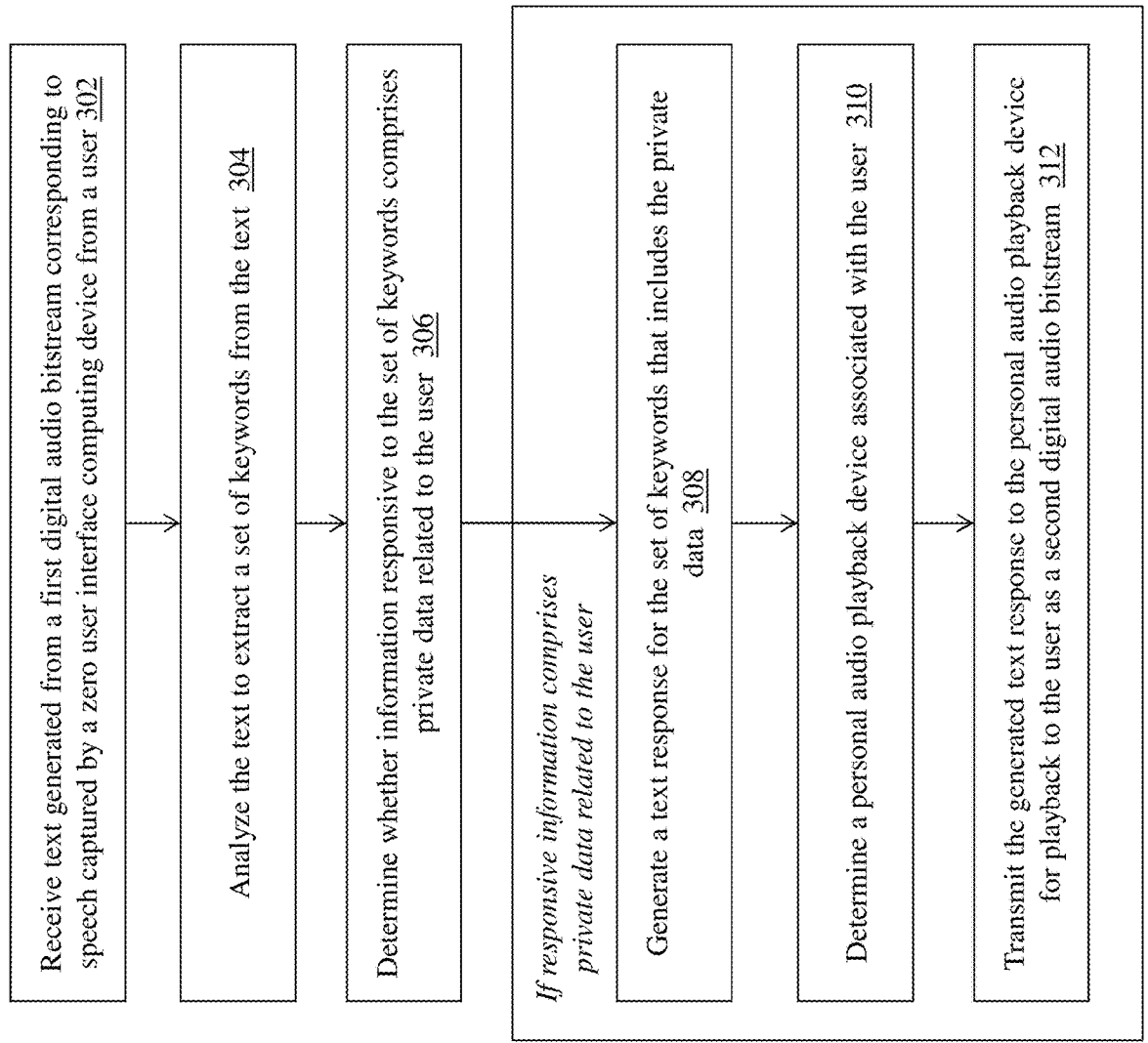

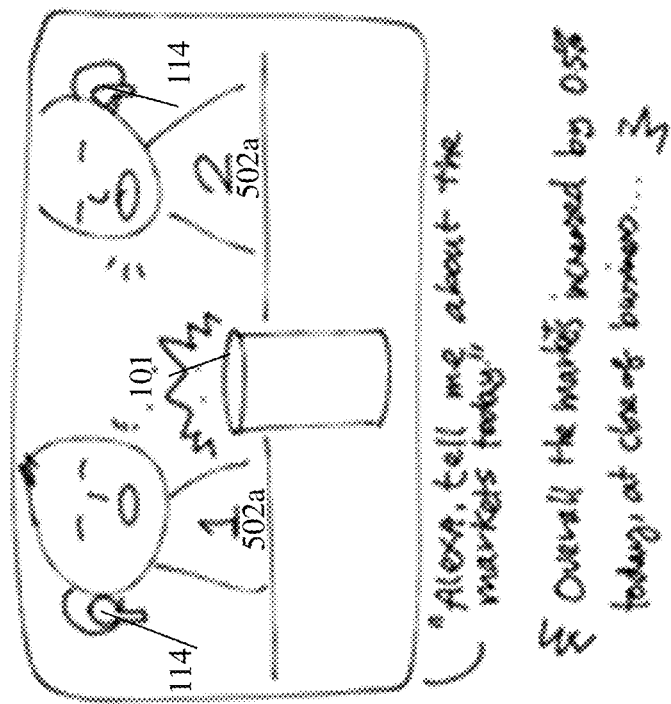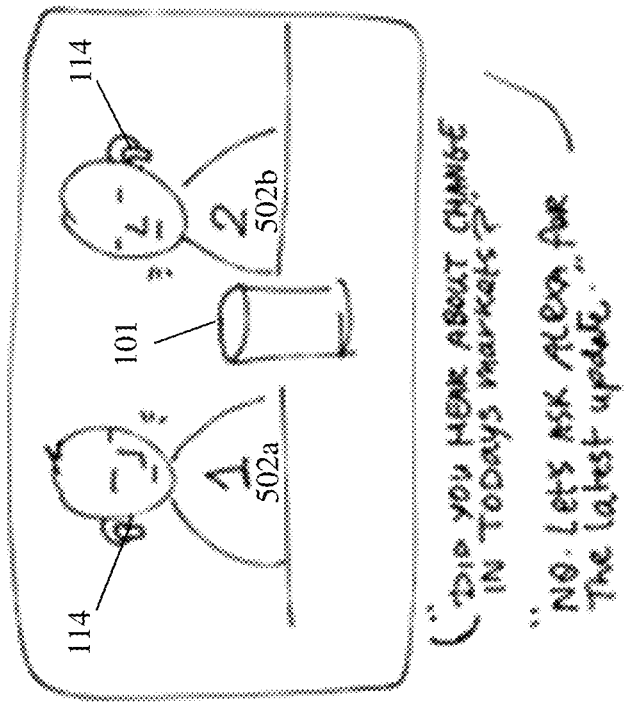
FIG. 5A

PROTECTION OF DATA IN A ZERO USER INTERFACE ENVIRONMENT

RELATED APPLICATIONS

This application claims priority to U.S. Provisional Patent Application No. 62/506,072, filed on May 15, 2017, the entire contents of which is incorporated herein by reference.

BACKGROUND

Zero user interface computing platforms have become increasingly popular in today's business environment. Instead of relying on clicking, typing and/or tapping, businesses can provide a more efficient interactive environment in which users are encouraged to input information to a computing device by means of voice and gestures, and to receive information from the computing device via loudspeaker or other auditory means. Statistics show that about 30% of human interactions with computers within the next two years will be voice-based. Microsoft Kinect™, Nest™ thermostats, and Amazon Echo™ are just a few popular examples of zero user interface devices. Amazon describes its Echo™ system as a hands-free speaker a user controls with his or her voice. Connected to the Internet and powered by Amazon's Alexa™ software, Amazon Echo™ does more than just play music. Starting with built-in capabilities called Skills, users can hire a car service, order pizza, get the weather report, and control smart homes through the Echo™ system. Generally, a zero user interface environment features user interfaces that are not constrained by screens, and instead encourage human-device interactions in more natural ways including haptic, computer vision, voice control, and artificial intelligence. One of the advantages of zero user interface computing platforms is that they allow users to interface with devices in a manner that is more human. At its extreme, a zero user interface computing environment implies a screen-less, invisible user interface where natural gestures trigger interactions, as if the user is communicating to another person.

In view of the rapid growth of zero user interface computing platforms, a growing concern involves the ability to securely transmit sensitive information to users and receive sensitive information from users without allowing the information to be overheard or otherwise intercepted by other parties—which would jeopardize the security of the system. For example, many zero user interface devices are configured to read data out loud or require the user to input data by voice, and such devices are not an effective or secure way of communicating sensitive information.

SUMMARY

Therefore, what is needed are methods and systems for secure communications in a zero user interface environment that enables the confidential transfer of information while still allowing for the customary interactions between a zero user interface device and a user of the device. The techniques described herein advantageously provide automatic secure routing of digitized private data through a personal audio playback device (e.g., headset) and/or a personal audio recording device (e.g., microphone) that is communicably coupled to the zero user interface computing device.

The invention, in one aspect, features a system for secure communications in a zero user interface computing environment. The system includes a server computing device that includes a memory for storing computer-executable instructions and a processor that executes the computer-executable instructions. The processor executes the computer-executable instructions to receive text generated from a first digital audio bitstream, the first digital audio bitstream comprising speech captured by a zero user interface computing device from a user. The processor executes the computer-executable instructions to analyze the received text to extract a set of keywords from the text. The processor executes the computer-executable instructions to determine whether information responsive to the set of keywords comprises private data related to the user. If the information responsive to the set of keywords comprises private data related to the user, the processor executes the computer-executable instructions to generate a text response for the set of keywords that includes the private data relating to the user, determine a personal audio playback device associated with the user, and transmit the generated text response to the personal audio playback device for playback as a second digital audio bitstream to the user.

The invention, in another aspect, features a computerized method of for secure communications in a zero user interface computing environment. A server computing device receives text generated from a first digital audio bitstream, the first digital audio bitstream comprising speech captured by a zero user interface computing device from a user. The server computing device analyzes the received text to extract a set of keywords from the text. The server computing device determines whether information responsive to the set of keywords comprises private data related to the user. If the information responsive to the set of keywords comprises private data related to the user, he server computing device generates a text response to the set of keywords that includes the private data relating to the user, determines a personal audio playback device associated with the user, and transmits the generated text response to the personal audio playback device for playback as a second digital audio bitstream to the user.

Any of the above aspects can include one or more of the following features. In some embodiments, if the information responsive to the set of keywords comprises only public data, the server computing device transmits the generated text response to the zero user interface computing device for playback to the user as a second digital audio bitstream via a speaker. In some embodiments, the server computing device routes the generated text response to the personal audio playback device via an intermediary computing device associated with the user. In some embodiments, the intermediary computing device is a mobile device. In some embodiments, the server computing device routes the generated text response directly to the personal audio playback device without using an intermediary device.

In some embodiments, the personal audio playback device is a headset. In some embodiments, determining whether information responsive to the set of keywords comprises private data relating to the user comprises executing a neural network on the set of keywords as input to generate a classification for the set of keywords, the classification indicating whether the set of keywords is associated with private data. In some embodiments, a speech recognition engine is executed on the first digital audio bitstream to generate the text.

In some embodiments, determining a personal audio playback device associated with the user comprises determining an identifier associated with the personal audio playback device. In some embodiments, the identifier associated with the personal audio playback device comprises one or more of: a hardware address or a network address. In some embodiments, the personal audio playback device comprises a microphone for capturing speech from the user.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a flow diagram of a computerized method of secure communications in a zero user interface environment.

FIGS. 5A and 5B illustrate an exemplary user interaction process with a zero user interface computing device.

DETAILED DESCRIPTION

Figure 1:
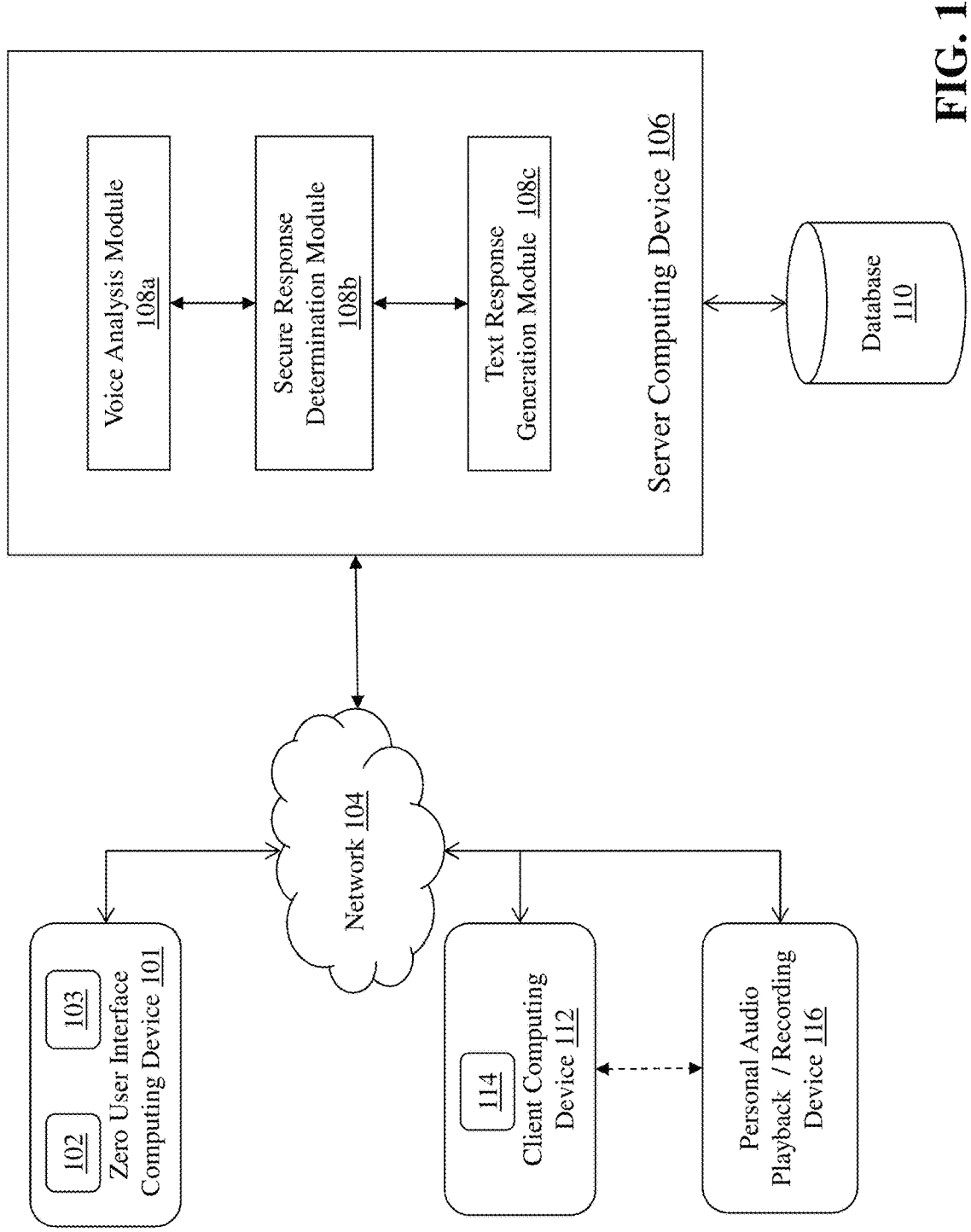
FIG. 1 is a block diagram of a system for secure communications in a zero user interface computing environment.

FIG. 1 is a block diagram of a system 100 for secure communications in a zero user interface computing environment. The system 100 includes a zero user interface computing device 101 that comprises a memory for storing computer-executable instructions and a processor for executing the computer-executable instructions. The zero user interface computing device 101 is coupled via communications network 104 to a server computing device 106. The server computing device 106 includes a voice analysis module 108a, a secure response determination module 108b that includes an artificial intelligence neural network for specific programming functions, and a text response generation module 108c. The server computing device 106 is coupled to a database 110. The system 100 further includes a client computing device 112 coupled to the server computing device 106 via communications network 104, and a personal audio playback/recording device 116 coupled to the client computing device 112 (and/or the server computing device 106 via network 104).

Exemplary zero user interface computing devices 101 include, but are not limited to, smart speakers (e.g., Amazon Echo™, Google Home™, Apple HomePod™), motion sensing input devices (e.g., Microsoft Kinect™), smart appliances, thermostats, and other types of devices. As indicated above, typically such devices include a memory and a processor (e.g., CPU) that enables the device 101 to execute software 102 stored in the memory that programmatically controls the operation of the device and enables the device to receive information from, and provide information to, a user via auditory means—such as speaker/microphone apparatus 103. Generally, a zero user interface computing device 101 also comprises network interface components (e.g., antenna, chip module) that enables the device to communicate wirelessly (e.g., via Bluetooth, Wi-Fi) with communication network 104. Although FIG. 1 depicts a single zero user interface computing device 101, it should be appreciated that the system 100 can include any number of zero user interface computing devices.

As mentioned above, the zero user interface computing device 101 can execute software 102, such as virtual assistant software (e.g., Amazon Alexa™, Apple Siri™, Google Assistant™). Generally, virtual assistant software enables the zero user interface computing device to perform a variety of functions such as voice interaction, music playback/streaming, providing news and information, controlling external smart devices, and so forth. In some cases, the virtual assistant software can be augmented with additional functionality via specific applications (called Skills™ in the case of Amazon Alexa™). These specific applications can be programmed to interface with remote computing device(s) (e.g., server computing device 106) for the purpose of retrieving information from the remote computing device(s) for playback to a user, and transmitting information captured from the user to the server computing device 106.

The zero user interface computing device 101 typically interacts with a user via an embedded speaker/microphone apparatus 103. The speaker/microphone apparatus 103 enables the device 101 to play audio content for a user and to receive speech from a user that is then translated into a digital form (e.g., digital audio file, text file) for interpretation by the local processor and/or remote computing device(s) (e.g., server computing device 106). In some embodiments, a user can pair a client computing device 112 and/or a personal audio playback/recording device 114 (e.g., wireless headset) with the zero user interface computing device 101 to use a speaker/microphone apparatus 103 that may be embedded in those devices 112, 114 to communicate with the zero user interface computing device 101.

The communications network 104 enables the other components of the system 100 to communicate with each other in order to perform the process of recognizing handwritten characters in digital images using context-based machine learning as described herein. The network 104 may be a local network, such as a Wi-Fi LAN or Bluetooth™ connection, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 108a-108c—that execute on the processor of the server computing device 106, to receive data from other components of the system 100, transmit data to other components of the system 100, and perform functions for secure communications in a zero user interface computing environment as described herein.

In some embodiments, the modules 108a-108c are specialized sets of computer software instructions programmed onto a dedicated processor in the server computing device 106 and can include specifically-designated memory locations and/or registers for executing the specialized computer software instructions. Further explanation of the specific processing performed by the modules 108a-108c will be provided below.

The database 110 comprises transient and/or persistent memory for data storage that is used in conjunction with the process of secure communications in a zero user interface computing environment as described herein. In some embodiments, all or a portion of the database 110 can be integrated within the server computing device 106 or be located on a separate computing device or devices. For example, the database 110 can comprise a database such as MySQL™ available from Oracle Corp. of Redwood City, Calif.

Exemplary client computing devices 112 include, but are not limited to, tablets, smartphones, laptops, desktops, and other computing devices. It should be appreciated that other types of client computing devices that are capable of connecting to the components of the system 100 can be used without departing from the scope of invention. Although FIG. 1 depicts a single client computing device 112, it should be appreciated that the system 100 can include any number of client computing devices.

The client computing device 112 can execute software applications, such as browser applications and native applications. In some embodiments, a browser application comprises software executing on a processor of the client computing device 112 that enables the device to communicate via HTTP or HTTPS with remote servers addressable with URLs (e.g., server computing device 106) to receive content, including one or more webpages, for rendering in the browser application and presentation on a display device embedded in or coupled to the client computing device 101. Exemplary mobile browser application software includes, but is not limited to, Firefox™, Chrome™, Safari™, and other similar software. In some embodiments, a native application is a software application (also called an 'app') that is installed locally on the client computing device 112 and written with programmatic code designed to interact with an operating system that is native to the device 112. Such software is available from, e.g., the Apple® App Store or the Google® Play Store.

The personal audio playback/recording device 114 is a hardware device that comprises a speaker for playback of audio to a user and/or a microphone for recording speech input from a user. The device 114 can be coupled to, e.g., the zero user interface computing device 101, the client computing device 112 and/or the server computing device 106 in order to receive audio content from, and transmit audio content to, those devices for the purpose of secure communications in a zero user interface computing environment as described herein.

Figure 2A:
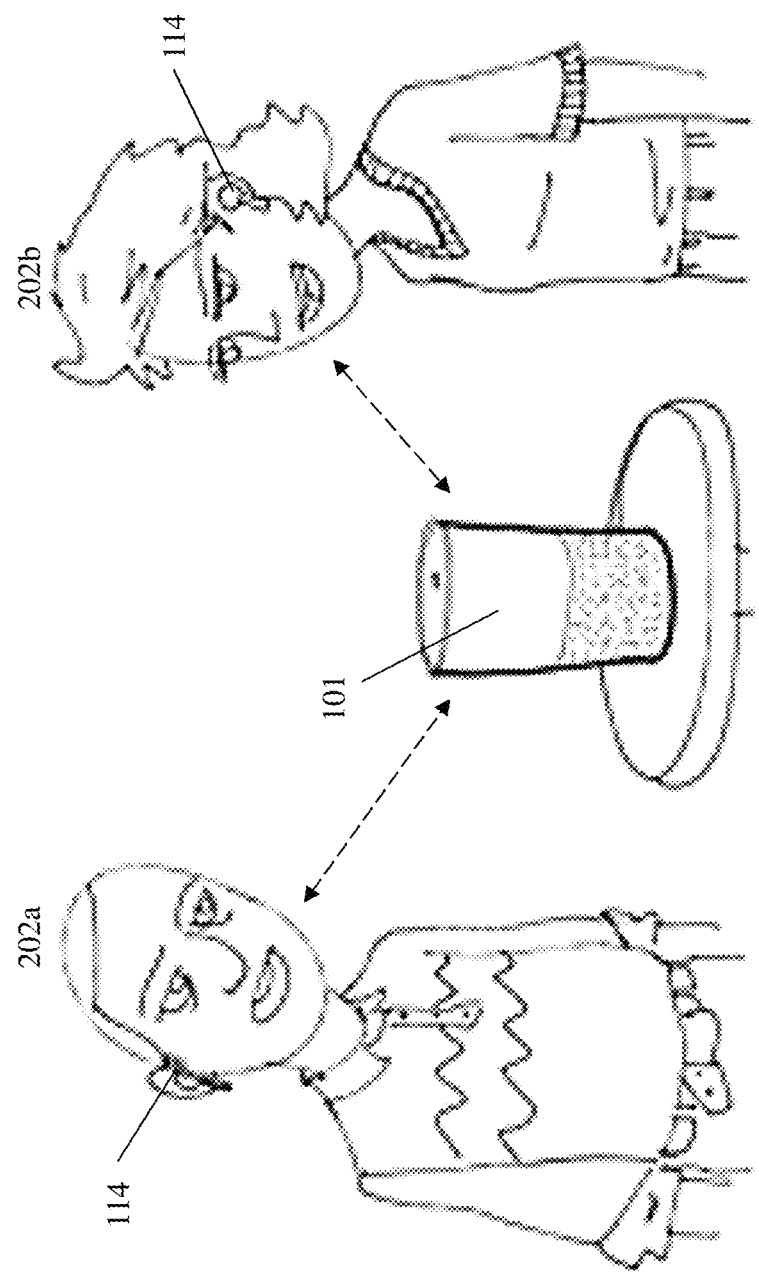
FIGS. 2A and 2B are diagrams of exemplary zero user interface computing environments, according to an embodiment of the invention.
Figure 2B:
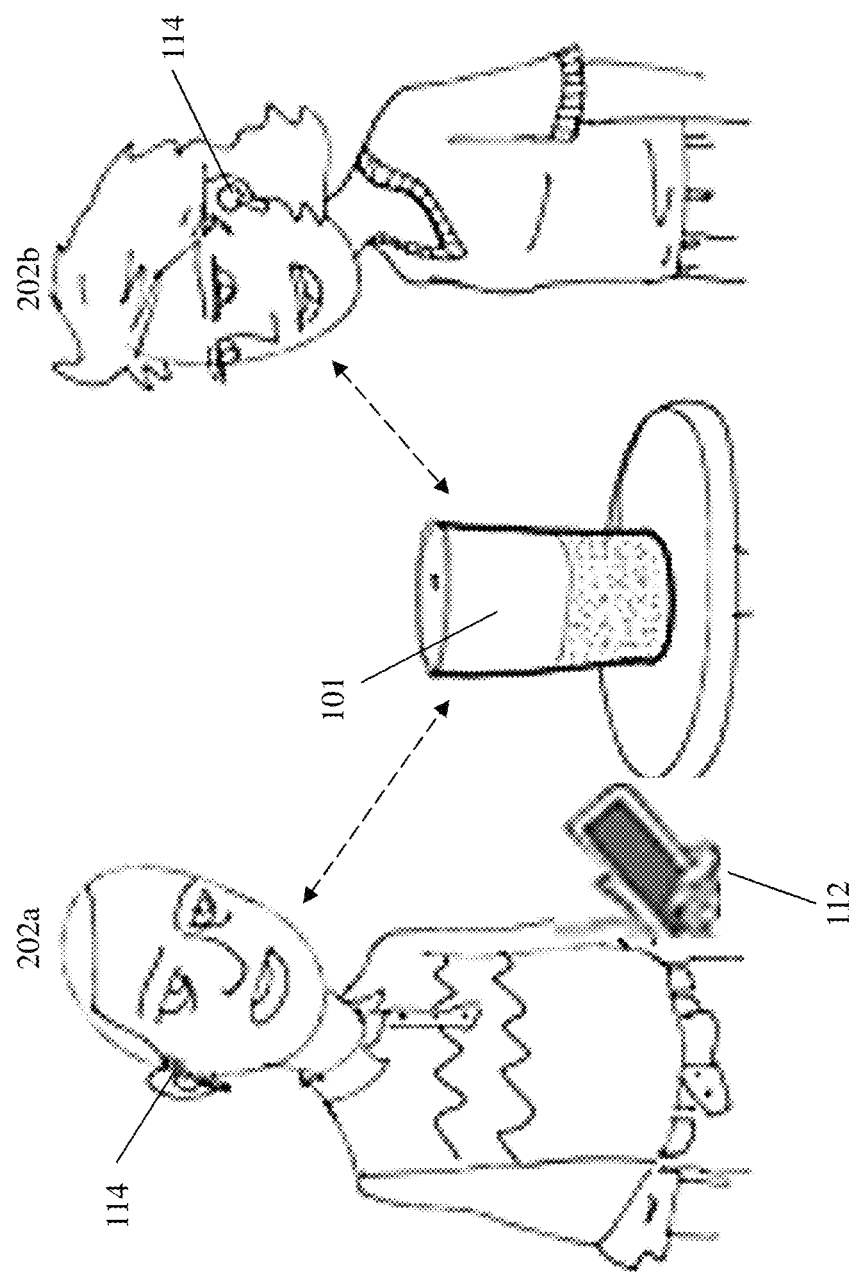

FIGS. 2A and 2B are diagrams of exemplary zero user interface computing environments, according to an embodiment of the invention. One or more users (e.g., users 202a-202b) can communicate with a zero user interface computing device 101, such as an Amazon Echo™ smart speaker. Each user 202a-202b wears a headset 114 that is either wired or wirelessly connected to a communications network 104. The users 202a-202b can ask the zero user interface computing device 101 for information using voice-based commands. In situations where data privacy is warranted, the requested data can be routed to a user's headset 114 instead being announced aloud using a speaker/microphone apparatus embedded in the zero user interface computing device 101. In some embodiments, such personalized routing can be accomplished indirectly, such as via a mobile computing device 112 of the user—as shown in FIG. 2B. Alternatively, if the headphone is wireless and agnostic of phones, voice data can be directly conveyed to the headphone.

It should be appreciated that in some embodiments, the system 100 can route audio data to a user's personal audio playback/recording device 114 based on a classification assigned to the data. For example, audio data can be classified (or tagged) as either public or private, where the zero user interface computing device 101 is configured to play back public audio data aloud using a speaker, but the zero user interface 101 (and/or the server computing device 106) routes private audio data to a user's personal audio playback/recording device 114, either directly (i.e., without an intermediary computing device) or indirectly (e.g., through an intermediary computing device, such as client device 112), such that only the user who is authorized to receive the information contained in the audio data can hear the audio data.

FIG. 3 is a flow diagram of a computerized method of secure communications in a zero user interface environment, using the system 100 of FIG. 1. The voice analysis module 108a receives (302) text generated from_a first bitstream containing a digitized voice segment corresponding to speech submitted by a user to a zero user interface computing device 101. For example, the user may be interacting with the zero user interface computing device 100 (via speech) to request and/or provide information (e.g., asking a question or providing instructions about certain events, products or services that are specific to the user, such as account balances, health information, security credentials, and the like). The voice analysis module 108a receives, e.g., the text that corresponds to_a digital audio bitstream of the user's speech and parses the text to extract specific keywords from the text. It should be appreciated that in some embodiments the voice analysis module 108a is capable of digitizing the voice segments, in the case that the segments are captured or otherwise received in non-digital form. In some embodiments, the zero user interface computing device 101 digitizes the user's speech into a bitstream and transmits the bitstream to the voice analysis module 108a, and in other embodiments, the zero user interface computing device 101 digitizes the user's speech into a bitstream and parses the bitstream to extract the specific segments, then transmits the segments to the voice analysis module 108a.

The zero user interface computing device 101 can also perform functions to improve the audio quality of the digitized voice segments, such as adjusting compression, converting the segments to another format, enhancing audio waveform attributes (e.g., filtering), reducing or eliminating background noise, and so forth.

The voice analysis module 108a extracts (304) one or more keywords from the text generated from the first digital audio bitstream.

The module 108a can perform techniques such as stop-word removal and context-specific word filtering in order to isolate specific keywords that correlate to, e.g., a specific inquiry embedded in the text or an action that the user desires from the system. For example, if the user says "What is the current account balance for my brokerage account?," the voice analysis module 108a may extract keywords "current," "account," "balance," "my," "brokerage," and "account." In some embodiments, the voice analysis module 108a can recognize specific name(s) (e.g., John Smith) in the digitized voice segment and retrieve user-specific information based upon the name(s)—e.g., by associating the user's name with a user-specific identifier (ID number, account number) and/or other type of user profile information.

The voice analysis module 108a transmits the set of keywords extracted from the digital audio bitstream to the secure response determination module 108b. As noted above, the secure response determination module 108b utilizes an advanced artificial intelligence neural network executing on the processor of the server computing device 108 that takes the set of keywords as input to determine (306) whether information responsive to the set of keywords comprises private data relating to the user.

Figure 4:
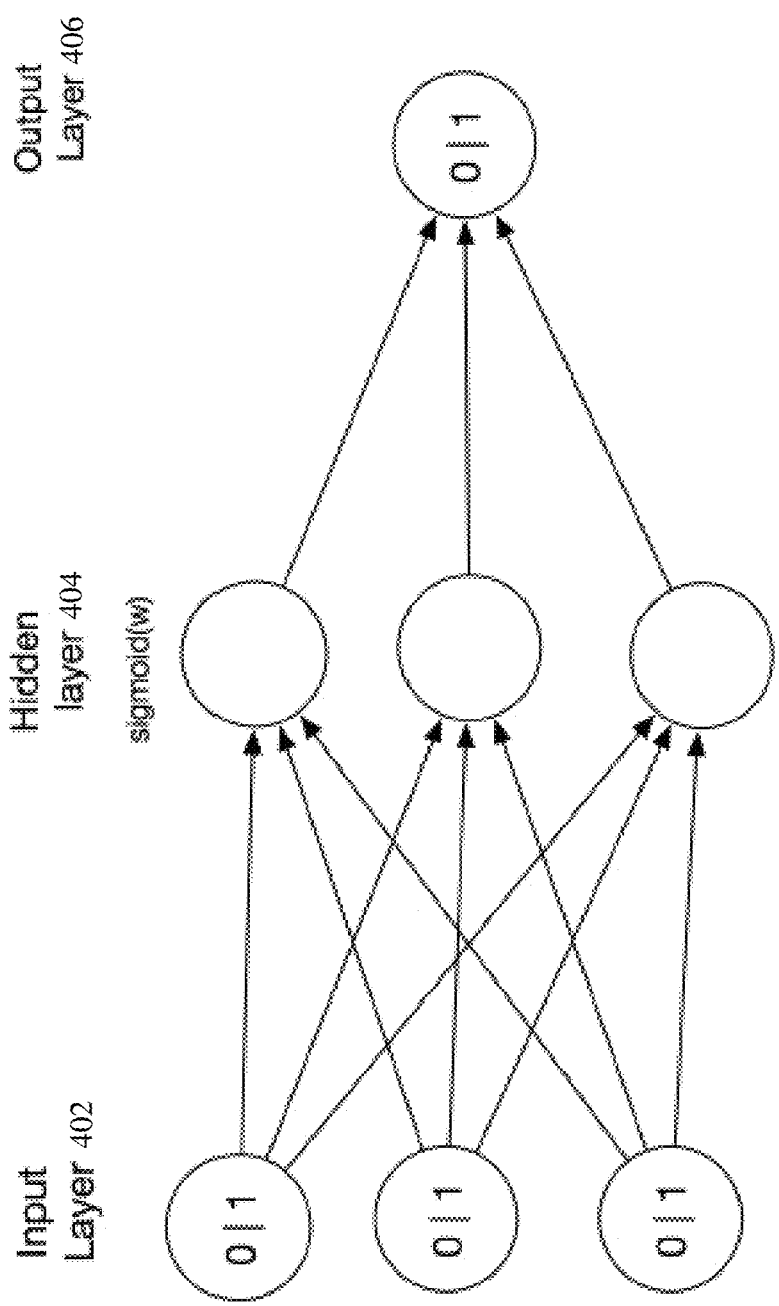
FIG. 4 is a diagram of an exemplary neural network model used by the secure response determination module.

In one embodiment, the neural network is a fully connected, feed forward neural network with a single hidden layer that is trained to recognize the linguistic context of the set of keywords and generate an output that classifies the set of keywords as associated with private data or not. FIG. 4 is a diagram of an exemplary neural network model used by the secure response determination module 108b. As shown in FIG. 4, the neural network 400 includes an input layer 402, a hidden layer 404, and an output layer 406.

In some embodiments, the neural network 400 is trained using the following approach. The secure response determination module 108b captures a set of training data that comprises a plurality of text string-isPrivate flag pairs. For example, an exemplary training data set may include data such as:

| Text String | IsPrivate Flag |
| --- | --- |
| tell me my balance | yes |
| what is my balance | yes |
| how many shares of <company> do I own | yes |
| how much did I gain today | yes |
| give me a market update | no |
| what companies were the most active today | no |
| what is the price of <company> shares | no |

The secure response determination module 108b processes each text string in the training data set using a one-hot encoder, e.g., at a character-level sequence of words, to generate input for the neural network 400. For example, the text string "Tell me about my balance" is one-hot encoded as vector:

[1 0 0 0 0 0 0 0 0 0 0 0 0 1 0 0 0 1 1 1 0 1 0 0 0 0 0 1 1 1 0 0 0 0 0 0 0 1]

Once the training data is encoded, the secure response determination module 108b splits the training data into two subsets: 90% training data and 10% test data. For example, the secure response determination module 108b can use k-fold cross validation techniques to partition the original training data set to k-equal sized subsets. Of the k subsets, one subset is used as validation data for testing the model, and the remaining k−1 subsets are used to train the model.

The neural network 400 utilizes the following activation function for the nodes in the hidden layer:

$$\sigma(z) = \frac{1}{1+e^{-z}}$$

The derivative of the above activation function is:

$$\sigma'^{(z)} = \sigma(z)(1-\sigma(z))$$

The nodes in the hidden layer process the input received from the input layer using the activation function to generate the output. The secure response determination module 108b initializes the nodes of the neural network with weight values (e.g., −1 to 1) and bias values (e.g., 0 to 1). The module 108b then executes the neural network (i.e., forward propagation) to generate the outputs and determine a cost associated with execution of the network. Then, the secure response determination module 108b utilizes back propagation and gradient descent to update the weight values and bias values, and thereby improve the accuracy and efficiency of the neural network. It should be appreciated that the secure response generation module 108b can train the neural network prior to deploying it in a production environment for classifying keywords extracted from user speech as relating to private data.

Once the secure response determination module 108b has trained the neural network, the module 108b can use the neural network to classify incoming sets of keywords as input to determine (306) whether information responsive to the set of keywords comprises private data relating to the user. For example, if the user asks, "What is my account balance?," the secure response determination module 108b uses the neural network to determine that the response to this question involves the transmission of private data that should not be conveyed to the user via a publicly-accessible channel—such as the speaker 103 on the zero user interface computing device 101. Therefore, the secure response determination module 108b classifies the response as private and flags the set of keywords using an IsPrivate=yes flag, as noted above.

The secure response determination module 108b indicates to the text response generation module 108c that the response to the user's speech should be sent via a personalized channel (e.g., personal audio playback/recording device 114). The text response generation module 108c generates (308) a text response for the set of keywords that includes the private data. For example, the text response generation module 108c can retrieve the user's account balance from database 110 (and/or another computing resource) as text information.

The text response generation module 108c then determines (310) a personal audio playback device (e.g., 114) associated with the user. In one embodiment, the text received by the server computing device 106 in step 302 can include an identifier associated with the personal audio playback device 114 and/or an accompanying client computing device 112 (e.g., a hardware address, a network address, and the like) that enables the text response generation module 108c to identify the specific device to which the text response should be sent. In another embodiment, the response generation module 108c can retrieve one or more identifiers associated with personal audio playback devices that the user has pre-assigned or pre-registered with the system 100, and the module 108c can select one or more of these devices as the destination for the text response (and/or prompt the user via client computing device 112 as to which personal audio playback device from the selected list should receive the response). The text response generation module 108c then transmits (312) the generated text response to the personal audio playback device 114 for playback to the user as a digital audio bitstream.

Figure 5B:
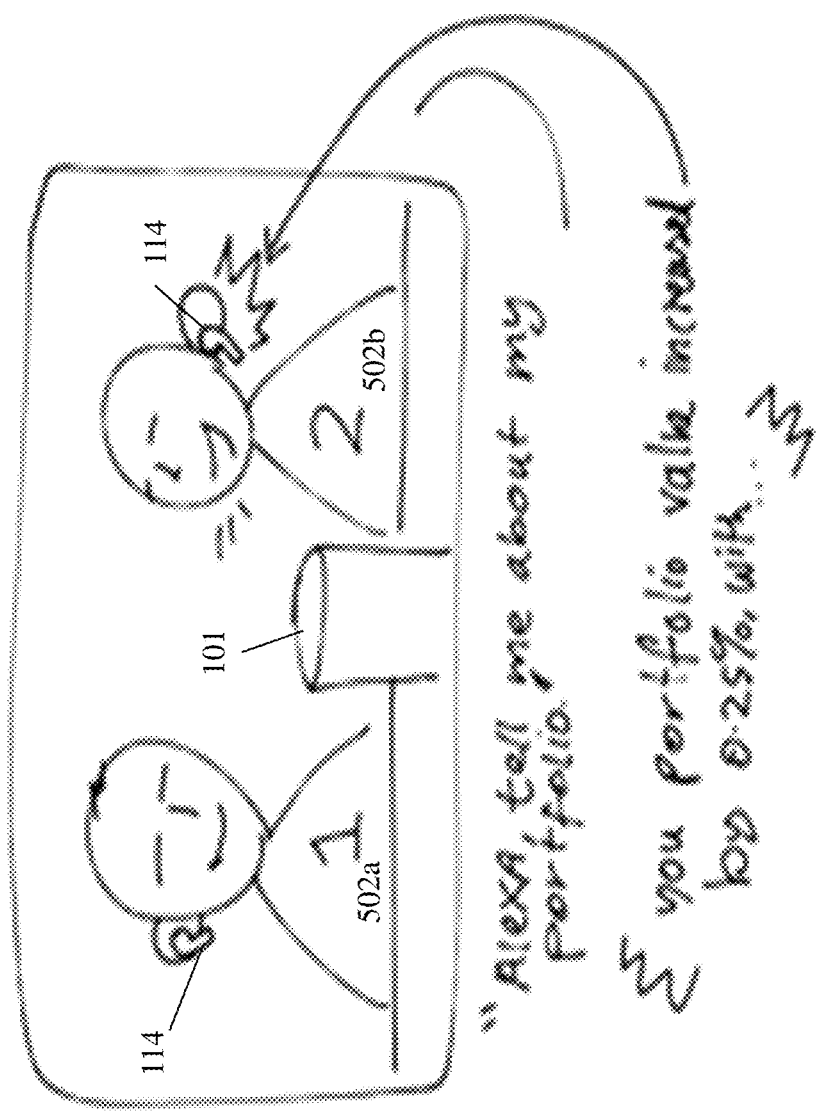

FIGS. 5A and 5B illustrate an exemplary user interaction process with a zero user interface computing device, using the system 100 of FIG. 1. In FIGS. 5A and 5B, one or more users 502a-502b submit a question or command to the zero user interface computing device 101 (e.g., via speaking to the device). In this example, the command ("Tell me about the markets today") is unlikely to involve communication of private user data. The zero user interface computing device 101 captures a bitstream containing the command, converts the bitstream into text corresponding to the spoken command, and transmits the text to the server computing device 106, which processes the text as described above with respect to FIG. 3 and determines that a response to the command involves publicly-available information. Therefore, the server computing device 106 generates a text response to the command and transmits the text response to both users' personal audio playback devices 114 and/or the speaker of the zero user interface computing device which can respond by publicly announcing the market information to the users.

In FIG. 5B, a user 502b asks the zero user interface computing device 101 another question, where the question involves conveyance of private data, such as "Tell me about my portfolio." In this situation, the zero user interface computing device 101 captures a bitstream containing the question, converts the bitstream into text corresponding to the spoken question, and transmits the text to the server computing device 106, which processes the received text as described above with respect to FIG. 3 and determines that a response to the question involves personal, confidential information. Therefore, the server computing device 106 generates a text response to the question but transmits the text response only to the personal audio playback device 114 of user 502b for playback as a digital audio bitstream, such that user 502a cannot hear the response, as shown in FIG. 5B. Thus, the server computing device 106, in connection with the zero user interface computing device 101, can intelligently decide how and when to present data to a user via a private channel based on the type of data solicited by the user.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Hyptertext Transfer Protocol Secure (HTTPS), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for secure communication of private audio data in a zero user interface computing environment, the system comprising a server computing device that includes a memory for storing computer-executable instructions and a processor that executes the computer-executable instructions to:
    receive text generated from a first digital audio bitstream, the first digital audio bitstream comprising speech captured by a zero user interface computing device from a user;
    analyze the received text to extract a set of keywords from the text;
    determine whether information responsive to the set of keywords comprises private data related to the user;
    if the information responsive to the set of keywords comprises private data related to the user:
        generate a text response for the set of keywords that includes the private data relating to the user;
        determine a personal audio playback device associated with the user; and
        transmit the generated text response to the personal audio playback device for playback to the user as a second bitstream.

2. The system of claim 1, wherein if the information responsive to the set of keywords comprises only public data, the server computing device transmits the generated text response to the zero user interface computing device for playback to the user as a second digital audio bitstream_via a speaker.

3. The system of claim 1, wherein the server computing device routes the generated text response to the personal audio playback device via an intermediary computing device associated with the user.

4. The system of claim 1, wherein the intermediary computing device is a mobile device.

5. The system of claim 1, wherein the server computing device routes the generated text response directly to the personal audio playback device without using an intermediary device.

6. The system of claim 1, wherein the personal audio playback device is a headset.

7. The system of claim 1, wherein determining whether information responsive to the set of keywords comprises private data relating to the user comprises executing a neural network on the set of keywords as input to generate a classification for the set of keywords, the classification indicating whether the set of keywords is associated with private data.

8. The system of claim 1, wherein a speech recognition engine is executed on the first digital audio bitstream to generate the text.

9. The system of claim 1, wherein determining a personal audio playback device associated with the user comprises determining an identifier associated with the personal audio playback device.

10. The system of claim 9, wherein the identifier associated with the personal audio playback device comprises one or more of: a hardware address or a network address.

11. The system of claim 1, wherein the personal audio playback device comprises a microphone for receiving the speech submitted by the user.

12. A computerized method of secure communication of private audio data in a zero user interface computing environment, the method comprising:
    receiving, by a server computing device, text generated from a first digital audio bitstream, the first digital audio bitstream comprising speech captured by a zero user interface computing device from a user;
    analyzing, by the server computing device, the text to extract a set of keywords from the text;
    determining, by the server computing device, whether information responsive to the set of keywords comprises private data related to the user;
    if the information responsive to the set of keywords comprises private data related to the user:
        generating, by the server computing device, a text response for the set of keywords that includes the private data relating to the user;
        determining, by the server computing device, a personal audio playback device associated with the user; and
        transmitting, by the server computing device, the text response to the personal audio playback device for playback to the user as a second digital audio bitstream.

13. The method of claim 12, wherein if the information responsive to the set of keywords comprises only public data, the server computing device transmits the generated text response to the zero user interface computing device for playback to the user as a second digital audio bitstream via a speaker.

14. The method of claim 12, wherein the server computing device routes the generated text response to the personal audio playback device via an intermediary computing device associated with the user.

15. The method of claim 12, wherein the intermediary computing device is a mobile device.

16. The method of claim 12, wherein the server computing device routes the generated text response directly to the personal audio playback device without using an intermediary device.

17. The method of claim 12, wherein the personal audio playback device is a headset.

18. The method of claim 12, wherein determining whether information responsive to the set of keywords comprises private data relating to the user comprises executing a neural network on the set of keywords as input to generate a classification for the set of keywords, the classification indicating whether the set of keywords is associated with private data.

19. The method of claim 13, wherein a speech recognition engine is executed on the first digital audio bitstream to generate the text.

20. The method of claim 12, wherein determining a personal audio playback device associated with the user comprises determining an identifier associated with the personal audio playback device.

21. The method of claim 20, wherein the identifier associated with the personal audio playback device comprises one or more of: a hardware address or a network address.

22. The method of claim 12, wherein the personal audio playback device comprises a microphone for capturing speech from the user.

* * * * *